US007024669B1

(12) United States Patent
Leymann et al.

(10) Patent No.: US 7,024,669 B1
(45) Date of Patent: Apr. 4, 2006

(54) MANAGING WORKLOAD WITHIN WORKFLOW-MANAGEMENT-SYSTEMS

(75) Inventors: Frank Leymann, Aidlingen (DE); Dieter Roller, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/513,350

(22) Filed: Feb. 25, 2000

(30) Foreign Application Priority Data

Feb. 26, 1999 (EP) .................................. 99103750

(51) Int. Cl.
*G06F 9/46* (2006.01)

(52) U.S. Cl. ...................... 718/100; 718/101; 718/102; 705/8

(58) Field of Classification Search ............... 705/7, 705/8; 709/102, 103, 223, 226; 345/803; 718/100, 102
See application file for complete search history.

(56) References Cited

U.S. PATENT DOCUMENTS

| 3,662,401 | A | * | 5/1972 | Collins ....................... 709/103 |
| 5,469,571 | A | * | 11/1995 | Bunnell ....................... 709/103 |
| 5,867,160 | A | * | 2/1999 | Kraft et al. .................. 345/803 |
| 5,974,392 | A | * | 10/1999 | Endo ............................. 705/7 |
| 6,289,488 | B1 | * | 9/2001 | Dave et al. .................. 709/102 |
| 6,424,948 | B1 | * | 7/2002 | Dong et al. ..................... 705/8 |
| 6,430,593 | B1 | * | 8/2002 | Lindsley ....................... 709/103 |

FOREIGN PATENT DOCUMENTS

WO    WO9827479    *    6/1998

OTHER PUBLICATIONS

Leymann et al (International Business Machine Corporation) Workflow-based applications.*
Volker et al "Workflow Management based on Process Model Repositories" discloses the concept of workflow and process model.*

* cited by examiner

*Primary Examiner*—Romain Jeanty
(74) *Attorney, Agent, or Firm*—Raphael Perez-Pineiro; Anne V. Dougherty

(57) ABSTRACT

A computerized method of managing workload within a Workflow-Management-System (WFMS), the WFMS having a process-model, the process-model including one or more activities being the nodes of an arbitrary graph, and directed edges of the graph defining a potential control-flow within the process-model. The method comprises a determination-step, wherein the process-model is analyzed if a priority-execution-indicator is assigned to the activity within the process model; and a launching step, wherein, in the affirmative case of the determination-step, the WFMS launches execution of the activity in the activity's execution-environment with an execution priority specified according to the priority execution indicator. Moreover the WFMS can set its own execution priority, and processing-related messages for communication are set to the execution priority specified.

14 Claims, 5 Drawing Sheets

```
PERFORMANCE_SPHERE QueryCustomerAccount
    EXECUTION_PRIORITY=HIGH
END QueryCustomerAccount PROGRAM_ACTIVITY GetCustomerInfo
    EXECUTION_PRIORITY=CRITICAL
    RELATED_PERFORMANCE_SPHERE QueryCustomerAccount
END GetCustomerInfo PROGRAM_ACTIVITY GetAccountBalance
    RELATED_PERFORMANCE_SHERE QueryCustomerAccount
END GetAccountBalance
```

FIG.1

| EXECUTION PRIORITY | OS | AIX | OS/2 |
|---|---|---|---|
| CRITICAL | 14 | . . . | . . . |
| HIGH | 10 | . . . | |
| MEDIUM | 7 | | |
| LOW | 4 | | |

FIG.2

Navigator locates activity

* Navigator sets message priority according to the execution priority of the activity Navigator inserts request message into program executor queue

* Program executor reads message from queue according to message priority

Program executor sets its operating system priority according to the execution priority of the activity

* Program executor launches the activity implementation with appropriate execution priority Program executor waits for completion

* Program executor resets its operating system priority to default

Program executor inserts completion message into navigator input queue

Navigator reads completion message

Navigator continues navigation

FIG.5

Navigator locates activity

* Navigator sets message priority according to the execution priority of the activity Navigator inserts request message into program executor queue Program executor reads message from queue according to message priority Program executor sets its operating system priority according to the execution priority of the activity Program executor launches the activity implementation with appropriate execution priority Program executor waits for completion Program executor resets its operating system priority to default

* Program executor sets message priority according to the execution priority of the performance sphere Program executor inserts completion message into navigator input queue Navigator reads completion message

* Navigator sets operating system priority according to execution priority of performance sphere Navigator continues navigation

FIG.6

MANAGING WORKLOAD WITHIN WORKFLOW-MANAGEMENT-SYSTEMS

FIELD OF THE INVENTION

The present invention relates to the area of performance and workload management within a Workflow-Management-System (WFMS).

BACKGROUND OF THE INVENTION

A new area of technology with increasing importance is the domain of Workflow-Management-Systems (WFMS). WFMS support the modeling and execution of business processes. Business processes executed within a WFMS environment control which piece of work of a network of pieces of work will be performed by whom and which resources are exploited for this work. The individual pieces of work might be distributed across a multitude of different computer systems connected by some type of network.

The product "IBM MQSeries Workflow" represents such a typical modern, sophisticated, and powerful workflow management system. It supports the modeling of business processes as a network of activities. This network of activities, the process model, is constructed as a directed, acyclic, weighted, colored graph. The nodes of the graph represent the activities which are performed. The edges of the graph, the control connectors, describe the potential sequence of execution of the activities. Definition of the process graph is via the IBM MQSeries Workflow Definition Language (FDL) or the built-in graphical editor. The runtime component of the workflow manager interprets the process graph and distributes the execution of activities to the right person at the right place, e.g. by assigning tasks to a work list according to the respective person, wherein said work list is stored as digital data within said workflow or process management computer system.

Business processes quite often consist of parts that are time critical, while others are not. In particular, time critical may be those parts of a process that are carried out automatically (i.e., without any user intervention). The only method that has been proposed to control the processing behavior of a set of activities in terms of workload balancing is via the support of a workload management system (WLMS). Even if the WFMS may exploit the support of a WLMS to achieve its processing targets, this is limited to certain processing environments only, since highly sophisticated operating systems like IBM's MVS system do provide this type of technology. Especially within a heterogeneous distributed processing environment, in which WFMS do operate, WLM-technology is missing on most of the involved systems.

An objective of the present invention is to provide an approach for performance-improved processing of time critical parts of a process model also operating within a heterogeneous and distributed environment.

SUMMARY OF THE INVENTION

The foregoing and other objectives of the invention are realized by the present invention comprising a computerized method of managing workload within a Workflow-Management-System (WFMS), said WFMS comprising a process-model, said process-model comprising one or more activities as the nodes of an arbitrary graph, and directed edges of said graph defining a potential control-flow within said process-model. The method comprises a determination-step, wherein said process-model is analyzed if a priority-execution-indicator is assigned to said activity within said process-model. The method comprises a launching-step, wherein, in the affirmative case of said determination-step, the WFMS launches execution of said activity in the activity's execution-environment with an execution-priority specified according to said priority-execution-indicator.

By taking over workload management functions the WFMS becomes independent of the availability of a workload load management system (WLMS). Thus the current teaching can be applied to almost all state-of-the-art systems which is a significant advantage in a distributed and inhomogeneous processing environment. Thus no platform limitations for workload management do apply anymore. Incorporating the workload priorities already within a process model makes this definitions most transparent. On this level the specifications can be easily modified with no changes, or only minor changes, to the activity implementation. With increasing system complexity and increasing parallel execution of workload within in a system the advantages of the current invention increase as more important activities will succeed within the competition for processing resources.

BRIEF DESCRIPTION OF THE DRAWINGS

The invention will now be described in greater detail with specific reference to the appended drawing wherein:

FIG. 1 shows the example of the definition of a process model including priority specifications on the level of a performance sphere as well as on the activity level;

FIG. 2 is a diagram reflecting the mapping of the canonical execution priority scheme within the process model to the particular operating system priorities available to execute the individual activities;

FIG. 5 reflects changes of the handling of messages compared to the situation in FIG. 4, if the current teaching of assigning execution priorities to involved messages in the execution process of an activity is applied. Changes are indicated by an asterisk (*);

FIG. 6 reflects changes of the handling of messages compared to the situation in FIG. 5, if the current teaching of performance spheres is included. Changes are indicated by an asterisk (*)

DETAILED DESCRIPTION OF THE PREFERRED EMBODIMENT

Figure 3:
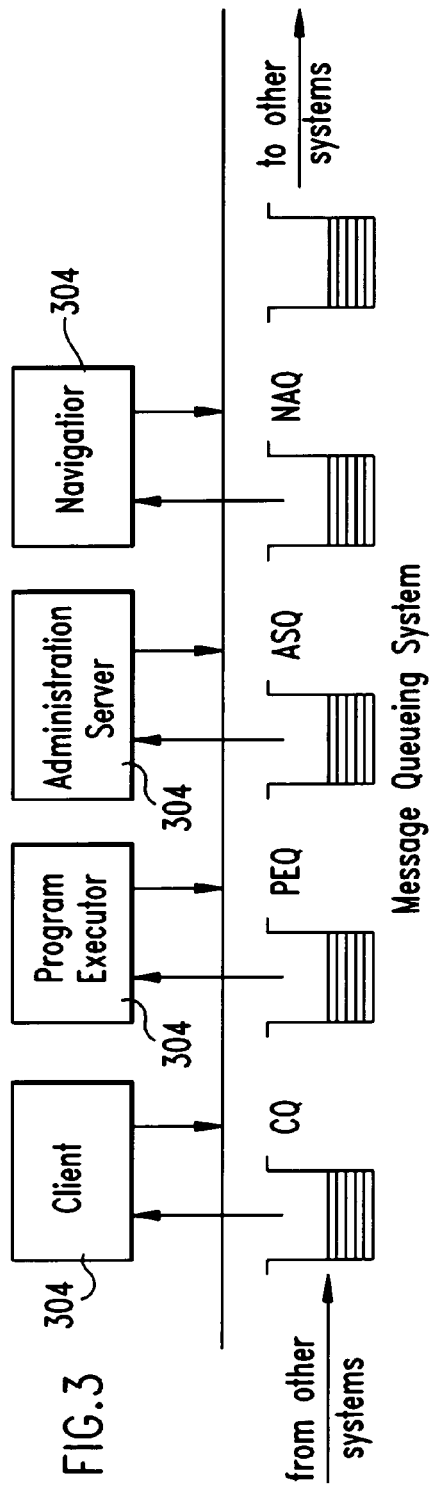
FIG. 3 visualizes the basic structure of a WFMS being based on message queuing as a communication paradigm reflecting the significant extent of benefit which can be achieved by also setting the priorities of the involved messages accordingly.

The current invention is illustrated based on IBM's MQSeries Workflow workflow management system. Of course any other WFMS could be used instead. Furthermore the current teaching applies also to any other type of system which offers WFMS functionalities not as a separate WFMS but within some other type of system.

Moreover, if the current teaching is referring to a "message", this has to be understood as a general exchange of information via some sort of communication system and is not limited specifically to a messaging system.

Introduction

The following is a short outline on the basic concepts of a workflow management system based on IBM's MQSeries Workflow WFMS as far as it is of importance for the current invention:

From an enterprise point of view the management of business processes is becoming increasingly important. Business processes, or process for short, control which piece of work will be performed by whom and which resources are exploited for this work, (i.e. a business process describes how an enterprise will achieve its business goals). A WFMS may support both the modeling of business processes and their execution.

Modeling of a business process as a syntactical unit in a way that is directly supported by a software system is extremely desirable. Moreover, the software system can also work as an interpreter basically getting as input such a model. The model, called a process model or workflow model, can then be instantiated and the individual sequence of work steps can be determined, depending on the context of the instantiation of the model. Such a model of a business process can be perceived as a template for a class of similar processes performed within an enterprise; such that it is a schema describing all possible execution variants of a particular kind of business process. An instance of such a model and its interpretation represents an individual process, i.e. a concrete, context-dependent execution of a variant prescribed by the model. A WFMSs facilitates the management of business processes. It provides a means to describe models of business processes (build time) and it drives business processes based on an associated model (run time). The meta model of IBM's WFMS MQSeries Workflow, including the syntactical elements provided for describing business process models and the meaning and interpretation of these syntactical elements, is described next.

A process model is a complete representation of a process, comprising a process diagram and the settings that define the logic behind the components of the diagram. Important components of a MQSeries Workflow process model are:

Processes
Activities
Blocks
Control Flows
Connectors
Data Containers
Data Structures
Conditions
Programs
Staff Not all of these elements will be described below.

Activities are the fundamental elements of the meta model. An activity represents a business action that is from a certain perspective a semantic entity of its own.

A MQSeries Workflow process model consists of the following types of activities:

Program activity: Has a program assigned to perform it. The program is invoked when the activity is started. In a fully automated workflow, the program performs the activity without human intervention. Otherwise, the user must start the activity by selecting it from a runtime work list. Output from the program can be used in the exit condition for the program activity and for the transition conditions to other activities.

Process activity: Has a (sub-)process assigned to perform it. The process is invoked when the activity is started. A process activity represents a way to reuse a set of activities that are common to different processes. Output from the process, can be used in the exit condition for the process activity and for the transition conditions to other activities.

The flow of control, i.e. the control flow through a running process, determines the sequence in which activities are executed. The MQSeries Workflow workflow manager navigates a path through the process that is determined by the evaluation to TRUE of start conditions, exit conditions, and transition conditions.

The results that are produced by the work represented by an activity are put into an output container, which is associated with each activity. Since an activity will generally require access to output containers of other activities, each activity is additionally associated with an input container.

Connectors link activities in a process model. Using connectors, one defines the sequence of activities and the transmission of data between activities. Since activities might not be executed arbitrarily they are bound together via control connectors. A control connector might be perceived as a directed edge between two activities; the activity at the connector's end point cannot start before the activity at the start point of the connector has finished (successfully). Control connectors thus model the potential flow of control within a business process model. Default connectors specify where control should flow when the transition condition of "no other control connector leaving an activity" evaluates to TRUE. Default connectors enable the workflow model to cope with exceptional events. Data connectors specify the flow of data in a workflow model. A data connector originates from an activity or a block, and has an activity or a block as its target. One can specify that output data is to go to one target or to multiple targets. A target can have more than one incoming data connector.

Process definition includes modeling of activities, control connectors between the activities, input/output container, and data connectors. A process is represented as a directed acyclic graph with the activities as nodes and the control/data connectors as the edges of the graph. The graph is manipulated via a built-in graphic editor. The data containers are specified as named data structures. These data structures themselves are specified via the DataStructureDefinition facility. Program activities are implemented through programs. The programs are registered via the Program Definition facility. Blocks contain the same constructs as processes, such as activities, control connectors etc. They are, however, not named and have their own exit condition. If the exit condition is not met, the block is started again. The block thus implements a "Do Until" construct. Process activities are implemented as processes. These subprocesses are defined separately as regular, named processes with all of their usual properties. Process activities offer great flexibility for process definition. It not only allows construction of a process through permanent refinement of activities into program and process activities (top-down), but also allows building of a process out of a set of existing processes (bottom-up).

All programs which implement program activities are defined via the Program Registration Facility. Registered for each program is the name of the program, its location, and the invocation string. The invocation string consists of the program name and the command string passed to the program.

The Prioritization Approach within WFMS

Business processes are made up of a set of activities. Business processes quite often consist of parts, for instance individual activities or collections thereof, some of which are time critical and some of which are not. For instance, a group of activities can be perceived as a set of services that are related from a business point of view, i.e. a unit of work that must jointly fulfill a performance goal (e.g., a collection of application steps to be performed by a clerk while a customer is waiting for a response). Also, parts of a process that are carried out automatically (i.e., without any user intervention) are such candidates.

Other candidates that are time critical are atomic spheres and processes that implement message broker functionality. Atomic spheres are collections of transactional work items (i.e. activities within the process model) with a common commit scope that thus represent a global transaction. For the purposes of defining such atomic spheres, the process model can be analyzed to identify subgraphs having the property that such a subgraph does not contain any activities which are connected by a path of control connectors which contains at least one activity not contained in said atomic-sphere.

The derivation of such collections of time critical activities is difficult and cumbersome in non-trivial cases because of the lack of information about the relation of application functions. This information is mostly hidden in special application programs, or the relation changes because of new requirements, because applications are integrated in new ways for interoperability etc. The larger the number of different applications participating in the workload management, the more complex the situation becomes. The situation is even worse in case of integration of different applications, especially if the applications originally have not been designed to work together.

As is typically the case in heterogeneous distributed processing environment, WFMS cannot rely on the support of an underlying WLMS for managing the processing targets of its managed activities. Current state-of-the-art WFMS neither have the information nor the capabilities to determine which activities to favor over others.

The present invention utilizes the approach of assigning priority levels to activities already within the process model. Moreover, the process model is enriched with semantic relations of application functions as collections of activities that should be pushed through the system in "optimal time", leading to the concept of performance spheres. Thus, according to the current teaching, priorities can be assigned on multiple levels including on the level of the whole process model, on the level of a new concept of performance spheres, or on the level of individual activities with the later level overriding the settings of the preceding levels. At execution time, the WFMS is responsive to these specifications, allowing it to set the priority with which a particular activity or set of activities should be carried out. The proposed solution uses the facilities of the operating system and middleware, such as message queuing, to control the performance of parts of a workflow, rather than using a workload management system. As such, it can deployed in all environments rather than being limited to certain platforms.

To identify the priority that should be assigned to an activity or a set of activities, a set of new properties are added to the meta model of the WFMS, wherein the priority definitions are already included in the process model of a business process.

First a new keyword EXECUTION_PRIORITY is added to the specification of an activity. Valid entries are CRITICAL, HIGH, MEDIUM, and LOW (or any other conceivable enumeration). For consistency, the keyword EXECUTION_PRIORITY may also be attributed to the whole process model. The specification on the process model level serves as a default from which all activities inherit, which means that if nothing is specified on the activity level, the setting at the process level is used.

Second, a new section PERFORMANCE_SPHERE is added that allows identification of a sub-graph in the process model. The EXECUTION_PRIORITY permits assignment of an execution priority to the sub-graph. Within a performance sphere, the execution priority defined for the sphere becomes the default execution priority for the individual activities. Again, the priority specifications on the activity level may override the specifications on the performance sphere level.

The specification shown in FIG. 1 shows the definition of a performance sphere. The sphere contains two activities. Referring to FIG. 1, the definition of a performance sphere (100) defining the default execution priority (101) for activities within the performance sphere is shown. Moreover, the definition of two activities (110) and (120) are visualized as part of the above performance sphere (112, 113). Within the specifications of the activity (110), an explicit execution priority (111) is defined, thus overriding the corresponding default execution priority (101) on the level of the encompassing performance sphere. In contrast to that, the specification of the activity (120) comprises no extra priority definition; therefore, it will be executed with the execution priority defined by its encompassing performance sphere (100).

According the current invention, the WFMS will be responsive to the priority specifications when executing the process model at run-time. The invention lets the WFMS balance its workload along the following dimensions:

1. by setting the execution priority of the activity implementation, and/or
2. by setting the execution priorities of the workflow system itself, and/or
3. by setting the priorities of the messages relating to the processing of said activity for communication within said WFMS and/or with said activity according to the activity's execution priority.

Setting the Priority of the Activity Implementation

State of the art operating systems assign a priority to each execution unit of the operating system, such as processes and threads (also known as light-weight processes). To simplify the description, the term process is used in the wider sense of comprising heavyweight processes, i.e. processes in the narrow sense, and light-weight processes, i.e. threads, or other types of execution units. Based on the priority, more or fewer of the resources are made available to the operating system process. The priority is assigned to the operating system process entity when the process is created. The priority can be supplied by the creator of the operating system process; such that the starter of an executable can specify the priority of the operating system process that is created for the executable. The executable itself can change the priority of the operating system process it is running in at any time, which mechanism will be used to allow the already executing WFMS to reset its own execution priority-see below).

If the activity implementation is an executable, the WFMS can assign a particular operating system priority under which the executable can be carried out. In this way, the program executor can give the executable a particular operating system priority based on the execution priority assigned to the activity. Since every operating system has a different priority scheme, the execution priorities need to be mapped to the priorities of the specific operating system used to execute the particular activity.

FIG. 2 shows the mapping of the canonical execution priority scheme within the process model to the particular operating system priorities available to execute the individual activities. It is assumed that the operating system, anonymously called OS, supports a priority scheme with 16 levels, 0 being the lowest and 15 being the highest level; extension to other operating systems are indicated. These control definitions have to be specified for each operating system for which executables are carried out as activity implementations. When such an activity is now carried out, the appropriate execution priority is mapped according to FIG. 2 to the appropriate operating system priority. This approach is of specific advantage for a WFMS executing in a distributed and heterogeneous processing environment.

Other mechanisms for prioritization exist for other types of activity implementations, such as objects managed by an object server, or the sending out a message that is picked up by the activity implementation. Without deviating from the proposed teaching, a corresponding mapping from the execution priority levels within the WFMS can be mapped onto the scheme used to control execution priority within the particular execution environment.

It should be noted that the setting of the execution priority can either be performed by the workflow management system, by the activity implementation, or by a combination of both. If, for example, the activity implementation is invoked by a message sent via a message queuing system, then the workflow management system sets the priority of the message that is sent and the activity implementation sets its execution priority based on the execution priority submitted in the message.

Setting the Workflow Management System Execution Priority

Complementary to changing the operating system priority for the executables, a further dimension of the current invention is that the workflow system itself modifies its own operating system priority when carrying out an activity implementation or when processing a performance sphere. Mapping the execution priority to the operating system priority can be done either as shown in FIG. 2 or with a similar scheme dedicated to the WFMS itself.

Setting the Message Priority

If the WFMS uses a communication system, such as message queuing, for communication between the different components of the WFMS, and if the communication system provides some type of priority assignable to the communication units (called "messages" in the current description), the current invention also suggests dynamically altering the priorities of those messages in accordance to the priorities of the activities. Therefore, it is suggested to set the priorities of the messages relating to the processing of a certain activity for communication within said WFMS and/or between different WFMS and/or with said activity according to the activity's execution priority. The mapping of the execution priority to the message priority is also done via a mapping similar to the one shown in FIG. 2. For instance, FIG. 2 could be extended by a further column relating to the priority levels available for the communication system.

The above-mentioned possibilities to influence priority based execution, (i.e., setting the execution priority of the workflow system itself and setting the execution priority of the messages) are independent from one another and thus can be exploited separately or in combination.

FIG. 3 shows the basic structure of a WFMS having message queuing as the communication paradigm (the invention of course also applies to any other model of communication). FIG. 3 reflects various WFMS components exchanging messages in their process of cooperation to perform execution of process models and thus illustrates the achievable advantages by also setting the message priorities according to the proposed teaching.

The navigator (301) performs the processing of the business processes, which includes navigating from activity to activity, determining the set of users to perform the activity, and requesting execution of the activity implementations from the program executor. The program executor (302) invokes the activity implementations using implementation type specific mechanisms, operating system functions or message queuing, for example. The administration service (303) controls the operation of the WFMS; and, the client (304) provides the application programming interface. As shown, communication between the components is performed via message queuing in this example. In fact, there is no need to use message queuing, but any priority-based communication mechanism will be sufficient to realize the current teaching.

From a logical point of view, using message queuing one can construct a "communications bus" for the WFMS similar to the hardware bus of a personal computer. When a component needs services from another component, it sends a message using the queue name of the appropriate component. The targeted component receives the message as soon as it is ready for processing. Correlation identifiers are associated with messages, if a response is expected from a component.

It is immaterial where each of the components resides, whether it is the same processor or a different processor. Using message queuing as the only communication bus, components can be placed wherever they are suited best.

Processing

Figure 4:
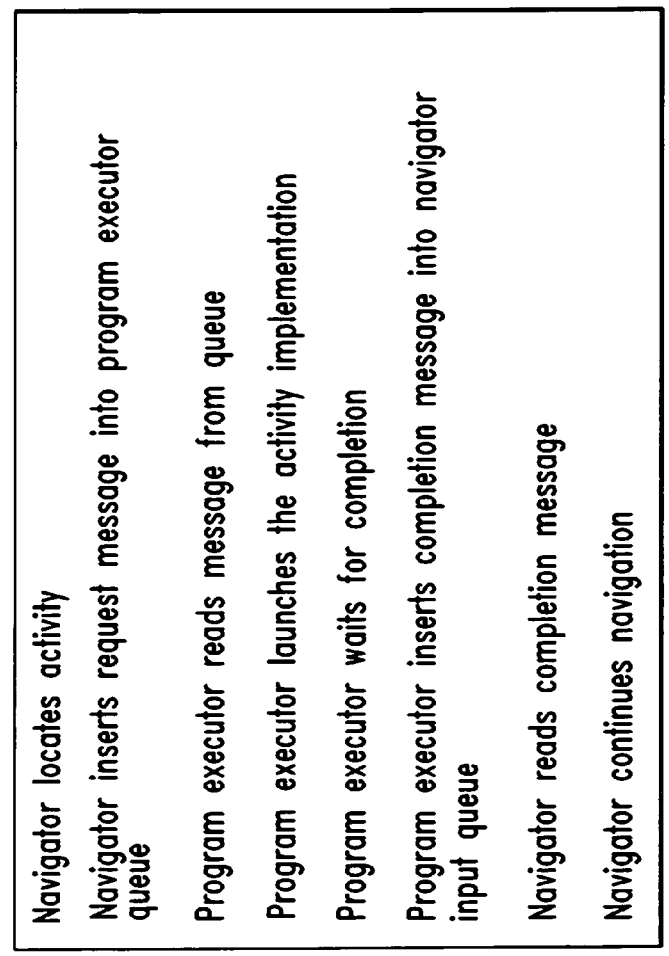
FIG. 4 reflects the handling of messages between various WFMS components for the processing of an activity without applying the current teaching.

The standard way of navigating through the process graph and invoking activity implementations involves a set of messages being exchanged between the navigator and the program executor. FIG. 4 refers to the handling of messages between various WFMS components for the processing of an activity without applying the current teaching. The example is based on an automatic activity, that means an activity whose activity implementation is automatically started when the activity has been selected during process navigation. The messages sent to the program executor are processed by the program executor on a first come, first served basis.

When a single activity is defined with an execution priority, the flow specified in FIG. 4 changes to the flow as shown in FIG. 5, if the current teaching of assigning execution priorities to involved messages in the execution process of an activity is applied. Changes are indicated by an asterisk. The message is now sent to the program executor with an appropriate message priority. This causes the message to be processed in priority sequence by the message system as well as by the WFMS. The higher the execution priority, the earlier the activity implementation is invoked. The activity implementation is launched with the appropriate execution priority; in the case of an executable, this is the corresponding operating system priority.

Within a performance sphere, the completion message is also assigned the message priority and the navigator sets its operating system priority that corresponds to the execution priority of the performance sphere. The foregoing changes the processing of FIG. 5 to the one in FIG. 6, with the changes being indicated by an asterisk.

Figure 7:
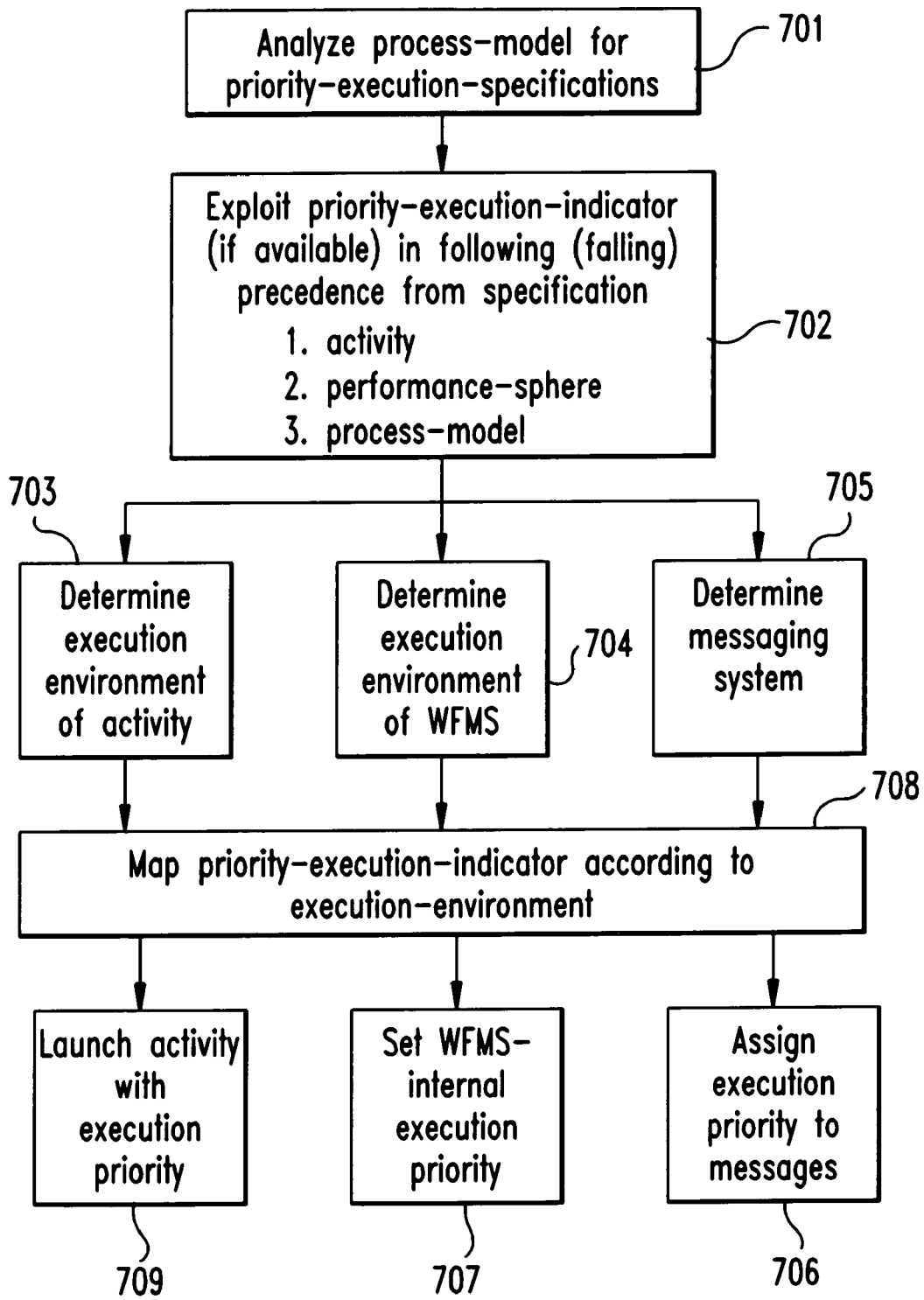
FIG. 7 depicts a summarizing overview on the proposed method.

FIG. 7 depicts a summarizing overview on the proposed method. Referring to FIG. 7, the step (701) reflects that the process model is analyzed for priority execution specifications. As depicted by step (702), it depends on the level priority execution specifications were found, which of the determined priority execution indicators is assigned as execution priority. Priority specifications on the activity level precede that on the performance sphere level; and, the priority specification determined on the performance sphere level precedes that on the process model level. The current invention influences the WFMS workload processing along three dimensions, as shown in steps (703), (704) and (705). To launch, as a first dimension, processing of a particular activity with an execution priority, first the execution environment of that particular activity is determined at step (703). Once the execution environment is known, that canonical execution priority value is mapped in step (704) onto the corresponding value according to that execution environment. This value is finally used in step (705) passing it to the execution environment when launching that particular activity. To set, as a second dimension, the execution priority of the WFMS-internal processing to a particular execution priority, the execution environment of that WFMS is determined at step (704). Once the execution environment is known, that canonical execution priority value is mapped in step (708) onto the corresponding value according to that execution environment. This value is finally used in step (707) to reset the WFMS-internal execution priority of that WFMS. To set, as a third dimension, the priority of a message exchanged via the communication system, first type of communication system is determined at (705). Based on that knowledge, the canonical execution priority value is mapped in step (708) onto the corresponding value according to that communication system. This value is finally used in step (707) to set the priority of a message communicated via the particular communication system. Correspondingly, the execution priority is assigned to all messages at 706 and the activity is launched with the execution priority at 709.

By taking over workload management functions, the WFMS become independent of the availability of a workload load management systems (WLMS). Thus, the current teaching can be applied to almost all state-of-the-art systems, which is of a significant advantage in a distributed and heterogeneous processing environment (i.e., in the typical application environment for WFMS). Thus, no platform limitations for workload management apply anymore. Incorporating the workload priorities already within a process model makes this definitions most transparent. On this level, the specifications can be easily modified with no changes, or only minor changes, to the activity implementation. With increasing system complexity and increasing parallel execution of workload within in a system, the advantages of the current invention will increase as more important activities succeed within the competition for processing resources.

Moreover, the workload processing is not limited to the activity only. Also, the proposed teaching allows the WFMS itself to participate within the workload processing. The invention teaches that those portions of the WFMS which directly support the processing of a certain process model are also prioritized in accordance to the activity's priority leading in a further increase of the efficiency of the workload processing.

As a further advantage the invention, the communication aspects are integrated into the workload processing. Prioritizing messages related to the processing of an activity in accordance to the activity's execution priority offers further workload management control. In distributed environments, as addressed by WFMS, the communication effort can be significant and thus providing workload control over this aspect can effectively contribute to the overall success of workload management. Moreover, this teaching is also applicable to the case where different WFMS instances are being executed in a distributed environment where the entities are cooperating via messages. Thus, the teaching allows the workload processing to span multiple machines in a distributed processing environment.

By allowing the assignment of execution priority specifications on various levels, including on the level of the process model as a whole, on the level of the new performance sphere concept, and/or for individual activities, a business process represented by a process model can be managed on all levels of granularity.

Assigning execution priority specifications can be done without knowing the different notions of priority levels of the individual potential execution environments. The priority levels offered according to the current teaching can be viewed as canonical priority levels, which will be mapped transparently by the WFMS using translation tables onto priority notions applying to the particular execution environment.

In addition the current invention teaches an WFMS launching execution of an activity in a direct and an indirect manner. In the direct approach, the WFMS is calling the activity with the determined execution priority. In the indirect approach, the WFMS launches execution of an activity indirectly by sending said activity a message set to the determined execution priority and said activity is responsive by setting its execution priority accordingly. Such a teaching offers important advantages in situations wherein, due to technical reasons (especially within distributed environments), an WFMS is not enabled to directly call an activity implementation (because, for instance, it is located remote to the launching WFMS).

The invention has been described with reference to several preferred arrangements. It should be understood that one having skill in the relevant art could make modifications without departing from the spirit and scope of the invention as set forth in the appended claims.

What is claimed is:

1. A computerized method of managing workload within a Workflow-Management-System (WFMS) said method being executable by said WFMS on at least one computer system, wherein said WFMS comprises a process model, said process model comprising one or more activities being the nodes of an arbitrary graph, and directed edges of said graph defining a potential control flow within said process model, said method comprising the steps of:

analyzing said process model to determine if a priority execution indicator is assigned to one of said one or more activities within said process model; and wherein said process model is further analyzed to determine if there is a priority execution specification associated with said activity, when said analyzing step indicates that there is a priority execution indicator for an activity, said WFMS launching execution of said activity with an execution priority specified according to said priority execution indicator; and when there is no priority execution specification of said activity, analyzing for a priority execution specification of a performance sphere comprising said activity, said performance sphere comprising a sub-graph of said process model associating a process execution indicator to activities within said performance sphere.

2. A method of managing workload within a WFMS according to claim 1, further comprising, when said analyzing step indicates that there is a priority execution indicator, said WFMS setting its own execution priority for WFMS internal processing to the execution priority specified according to said priority execution indicator.

3. A method of managing workload within a WFMS according to claim 2, further comprising, when said analyzing step indicates that there is a priority execution indicator, setting the priority of one or more messages relating to the processing of said activity are set to the execution priority specified according to said priority execution indicator.

4. A method of managing workload within a WFMS according to claim 2, wherein said activity requires a specific execution-environment and wherein said launching further comprises mapping said priority execution indicator to a value in accordance to said WFMS's specific execution-environment.

5. A method of managing workload within a WFMS according to claim 3, wherein said one or more messages are communicated along a communication-system and wherein said launching further comprises mapping said priority execution indicator to a value in accordance to said communication-system.

6. A method of managing workload within a WFMS according to claim 3, said launching further comprises said WFMS launching execution of said activity directly by calling said activity with said execution priority.

7. A method of managing workload within a WFMS according to claim 3, wherein said launching further comprises said WFMS launching execution of said activity indirectly by sending said activity a message set to said execution priority and said activity being responsive by setting its execution priority accordingly.

8. A method of managing workload within a WFMS according to claim 1, further comprising, when said analyzing step indicates that there is a priority execution specification for said activity, assigning the priority execution indicator of said priority execution specification of said activity to said activity.

9. A method of managing workload within a WFMS according to claim 1, further comprising, when a priority execution specification of said performance sphere is located, assigning the priority execution indicator of said priority execution specification of said performance sphere to said activity.

10. A method of managing workload within a WFMS according to claim 1, further comprising, when a priority execution specification is not located for said performance sphere, analyzing said process model for a priority execution specification associated with said process model and assigning the priority execution indicator of said priority execution specification of said process model to said activity.

11. A method of managing workload within a WFMS according to claim 1, wherein said activity requires a specific execution-environment and wherein said launching further comprises mapping said priority execution indicator to a value based on said activity's specific execution environment.

12. A data processing program for execution in a data processing system comprising software code portions for performing a method for managing workload within a Workflow-Management-System (WFMS) said method being executable by said WFMS on at least one computer system, wherein said WFMS comprises a process model, said process model comprising one or more activities being the nodes of an arbitrary graph, and directed edges of said graph defining a potential control flow within said process model, said method comprising the steps of:

analyzing said process model to determine if a priority execution indicator is assigned to one of said one or more activities within said process model wherein said process model is further analyzed to determine if there is a priority execution specification associated with said activity, when said analyzing step indicates that there is a priority execution indicator for an activity, said WFMS launching execution of said activity with an execution priority specified according to said priority execution indicator; and when there is no priority execution specification of said activity, analyzing for a priority execution specification of a performance sphere comprising said activity, said performance sphere comprising a sub-graph of said process model associating a process execution indicator to activities within said performance sphere.

13. A program storage device readable by machine, tangibly embodying a program of instructions executable by the machine for performing method steps for managing workload within a Workflow-Management-System (WFMS) said method being executable by said WFMS on at least one computer system, wherein said WFMS comprises a process model, said process model comprising one or more activities being the nodes of an arbitrary graph, and directed edges of said graph defining a potential control flow within said process model, said method comprising the steps of:

analyzing said process model to determine if a priority execution indicator is assigned to one of said one or more activities within said process model wherein said process model is further analyzed to determine if there is a priority execution specification associated with said activity, when said analyzing step indicates that there is a priority execution indicator for an activity, said WFMS launching execution of said activity with an execution priority specified according to said priority execution indicators; and when there is no priority execution specification of said activity, analyzing for a priority execution specification of a performance sphere comprising said activity, said performance sphere comprising a sub-graph of said process model associating a process execution indicator to activities within said performance sphere.

14. A system for managing workload in a computer system comprising:

a Workflow-Management-System (WFMS) on at least one computer in said system, said WFMS comprises a process model, said process model comprising one or more activities being the nodes of an arbitrary graph, and directed edges of said graph defining a potential control flow within said process model;

at least one processor component for analyzing said process model to determine if a priority execution indicator is assigned to one of said one or more activities within said process model wherein said process model is further analyzed to determine if there is a priority execution specification associated with said activity, an activity launching component for causing said WFMS to launch execution of said activity, when said analyzing step indicates that there is a priority execution indicator for an activity, said WFMS launching execution of said activity with an execution priority specified according to said priority execution indicator; and when there is no priority execution specification of said activity, said at least one processor component analyzing for a priority execution specification of a performance sphere comprising said activity, said performance sphere comprising a sub-graph of said process model associating a process execution indicator to activities within said performance sphere.

* * * * *